United States Patent [19]
Raad

[11] Patent Number: 5,345,125
[45] Date of Patent: Sep. 6, 1994

[54] MINIATURE, MODULAR, PLUG-IN ROTATING SWITCH

[75] Inventor: Bernard A. Raad, Burbank, Calif.

[73] Assignee: EEMCO/DATRON, Inc., Los Angeles, Calif.

[21] Appl. No.: 930,711

[22] Filed: Aug. 14, 1992

[51] Int. Cl.⁵ .................... H02K 11/00; H02K 47/04
[52] U.S. Cl. .................. 310/68 A; 310/113; 307/87
[58] Field of Search ..................... 310/68 R, 68 A, 61, 310/113, 114; 322/10–12; 290/38, 46; 335/126, 131; 307/16, 57, 78, 84, 87

[56] References Cited

U.S. PATENT DOCUMENTS

| | | | |
|---|---|---|---|
| 3,289,595 | 12/1966 | Bach | 310/54 |
| 3,548,133 | 12/1970 | Clauson | 200/81.9 |
| 3,622,820 | 11/1971 | Tjernstrom | 310/53 |
| 4,476,407 | 10/1984 | Hildebrandt et al. | 310/71 |
| 4,500,759 | 2/1985 | deFasselle et al. | 200/82 E |
| 4,551,594 | 11/1985 | Katoh | 200/82 R |
| 4,734,601 | 3/1988 | Lewus | 310/68 E |
| 4,743,776 | 5/1988 | Baehler et al. | 290/31 |
| 4,868,906 | 9/1989 | Oilschlager, Jr. | 310/68 E |
| 4,908,540 | 3/1990 | Motodate et al. | 310/240 |
| 4,939,441 | 7/1990 | Dhyanchand | 318/718 |

FOREIGN PATENT DOCUMENTS 2018030 10/1979 United Kingdom ............... 335/131

Primary Examiner—Steven L. Stephan
Assistant Examiner—C. LaBalle
Attorney, Agent, or Firm—Trexler, Bushnell, Giangiorgi & Blackstone, Ltd.

[57] ABSTRACT

A switch is used to disable electrical generation by causing a short circuit in a rotating main generator field of a brushless, synchronous generator to protect against transients voltage spikes during start-up. The switch is located inside of a hollow rotor shaft of the generator. In one embodiment the switch is activated by a solenoid assembly. In a second embodiment, the switch is activated by a alternate or redundant method by oil flow through the rotor shaft.

11 Claims, 4 Drawing Sheets

MINIATURE, MODULAR, PLUG-IN ROTATING SWITCH

BACKGROUND OF THE INVENTION

In vehicular applications, an engine-driven generator is used to convert a portion of the mechanical power produced by the engine to electricity in order to power the vehicle's electrical loads. Certain applications require that a single device provide the capabilities of a generator and also operate as an electrical motor. The electric motor capability is used to start the driving engine, thus eliminating the need for a separate starter, or at least providing an auxiliary starting system for redundancy.

One method of electrically starting the engine employs the generator as an inductor motor. In this method the generator is typically a synchronous-type generator. Since most synchronous generators incorporate an amortisseur or damper winding imbedded in the pole faces, this winding may be used to interact with the stator to produce rotation similar to a squirrel-cage induction motor.

A brushless, self-excited synchronous generator can be employed as a squirrel-cage induction motor. A brushless generator is advantageous because the brushless condition only allows contact between rotating and stationary elements through bearings whose operating life is well defined and can be designed to match, if not exceed the life of the machine. A brushless, self-excited synchronous generator, however, features rotating rectifiers spaced around its rotor. These rectifiers are normally semiconductor diodes which, because of rating limitations, must be protected against voltage spikes and other severe transients generated in the rotating field during a start cycle while performing as an induction motor. When the generator is operating in a generate mode, the function of these diodes is to rectify the AC produced in the rotating exciter armature into DC which is required by the rotating magnetic field of the main generator.

One way to protect these diodes is to apply a short-circuit across the rotating main field winding of the generator during the start cycle. This short-circuit effectively isolates and protects the diodes from excessive voltage spikes and other transients produced in the field winding during the start cycle. This short-circuit across the rotating field eventually must be removed, and the entire rotor circuit restored upon completion of the start cycle, when the generator is required to generate electrical power.

Other problems arise in this type of system. The circuit resides in a rotating member. The circuit must be reconfigured for starting or generation without using any brushes or other sliding contacts in order to retain the brushless condition. Also, other parameters such as centrifugal forces and shock and vibration must be taken into account when designing the system because these dynamic forces can, singularly or in combination, contribute to the physical loads experienced by the device. In particular, shock and vibration may occur in any one of the three orthogonal axes, or simultaneously in various directional combinations during rotation.

The present invention overcomes all of these problems.

OBJECTS AND SUMMARY OF THE INVENTION

A general object of the present invention is to provide a switch for use with machines operable as both a generator and as an inductor motor, which switch operates during the start cycle of the machine when the rotating main generator field creates transient currents and voltage spikes.

Another general object of the present invention to actuate the switch automatically by use of a solenoid coil or fluid flow. The use of the fluid flow acts as either a primary means of actuation or as a secondary, redundant means of actuation under various conditions.

A further object of the invention is to minimize the effects of centrifugal forces, imposed by shaft rotation, on the switch.

Yet another object of the invention is to utilize fluid flowing through the hollow rotor shaft to cool the switch.

Still another object of the invention is to minimize the overall size of the machine.

It is a further object of the present invention that the switch is modular and is capable of being connected to the device with minimum effort.

Briefly, and in accordance with the foregoing, the present invention is directed to an improved switch for a synchronous device operable as both a generator and an induction motor. The device includes a modular switch located inside a fluid-flooded, hollow rotor shaft of the device positioned coincident with the axis of rotation of the shaft. The proximity of the switch coincident with the axis of rotation minimizes the effects of centrifugal forces, imposed by shaft rotation, on the switch. Since the switch is located inside the rotor shaft, otherwise wasted space is utilized. This minimizes the size of the device which minimizes the overall size of the machine. Fluid flowing through the hollow rotor shaft cools the switch. The switch is activated automatically by a solenoid coil or fluid flow under various conditions. When the device experiences benign conditions and axial vibration and shock modes are small, the force of the fluid flowing through the hollow rotor shaft is the primary means of actuation. When the device experiences higher dynamic forces, this force becomes a secondary actuation method, used in a redundant mode to allow generation in case of solenoid failure.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE ILLUSTRATED EMBODIMENTS

Figure 1:
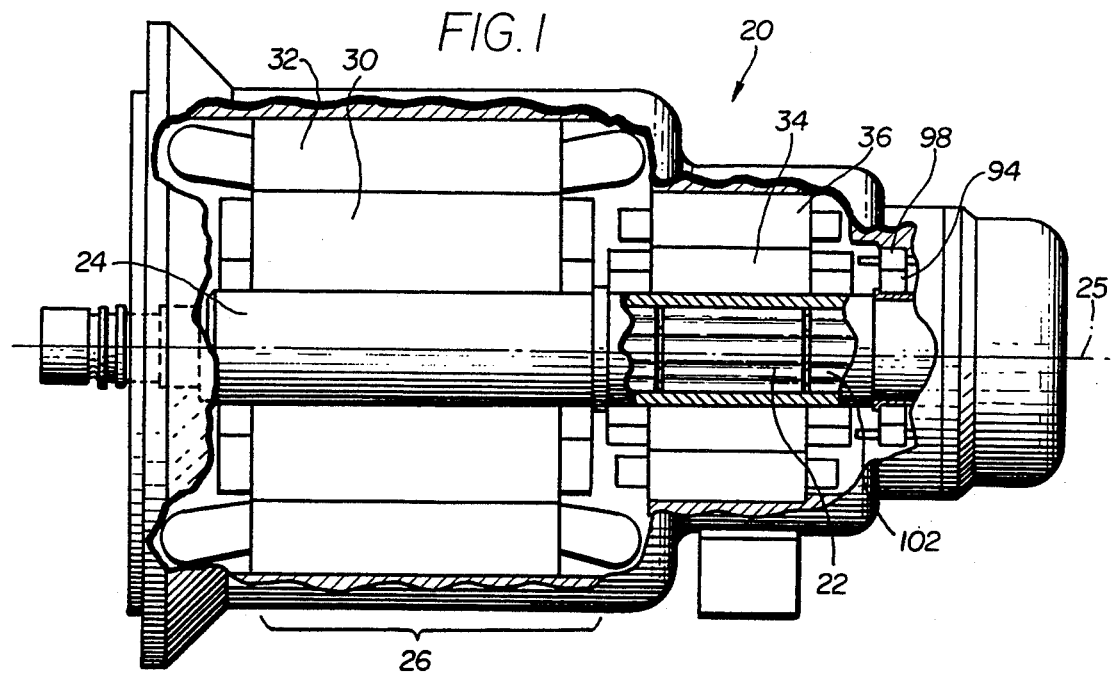
FIG. 1 is a partial fragmentary side elevational view of a generator employing a switch according to the present invention.
Figure 2:
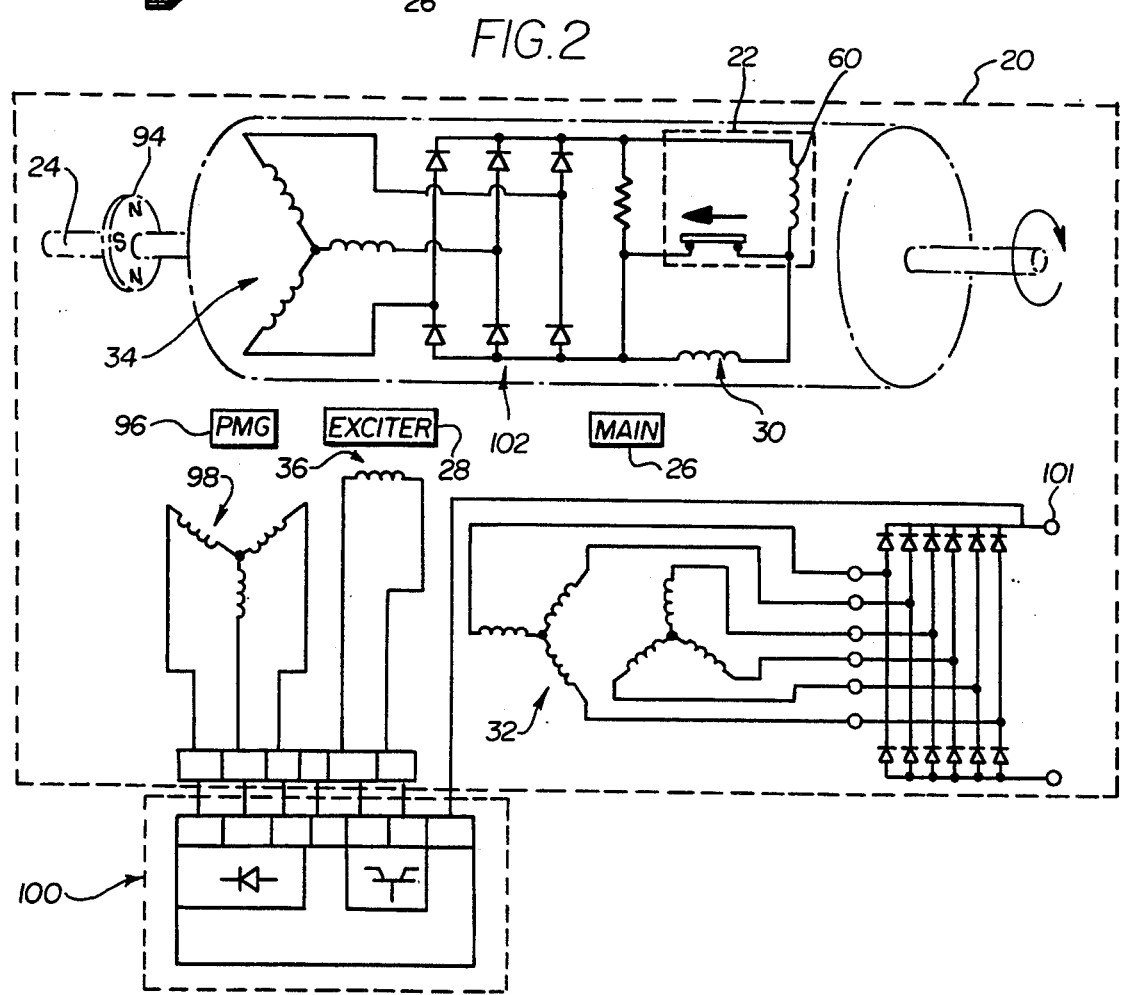
FIG. 2 is a diagramatic electrical schematic of the generator.

While the invention. may be susceptible to embodiment in different forms, there is shown in the drawings, and herein will be described in detail, specific embodiments with the understanding that the present disclosure is to be considered an exemplification of the principles of the invention and is not intended to limit the invention to that as illustrated and described herein.

Referring now to the drawings, wherein like parts are designated by the same reference numerals throughout the figures, a generator 20 employing a means for disabling the generator or switch 22 in accordance with the present invention is shown in FIG. 1. The generator 20 includes a fluid flooded, hollow rotor shaft 24 located along the center axis 25. The rotor shaft 24 is located interior to a main generator 26 and an exciter 28. The main generator 26 includes a rotating main generator field 30 surrounded by the main generator armature 32. The exciter 28 includes a rotating exciter armature 34 and a stationary exciter field 36.

Figure 4:
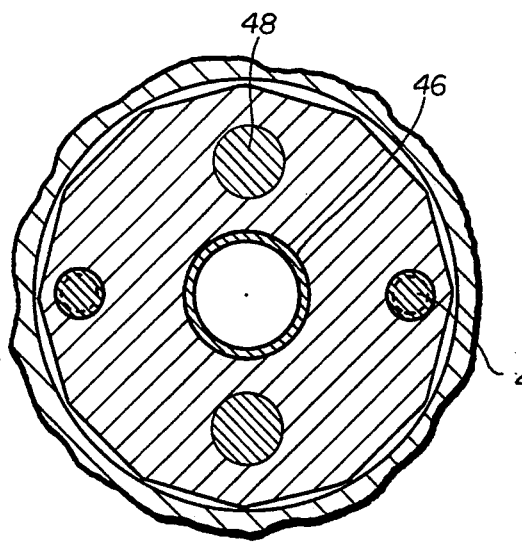
FIG. 4 is a cross-sectional detail of the switch taken along line 4—4 in FIG. 3.
Figure 5:
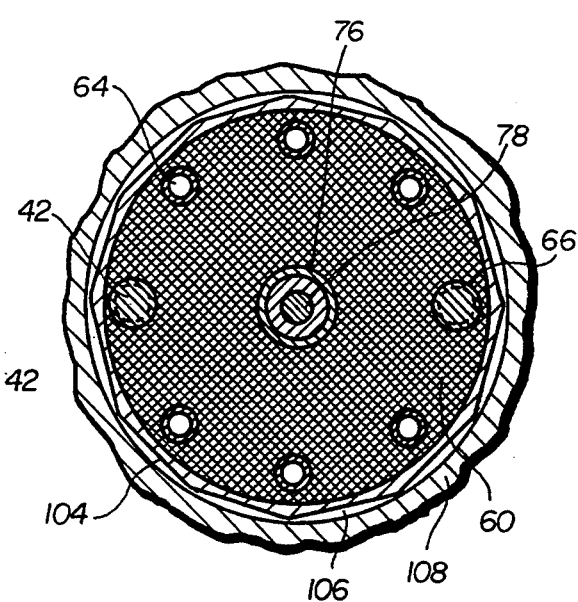
FIG. 5 is a cross-sectional detail of the switch taken along line 5—5 in FIG. 3.
Figure 6:
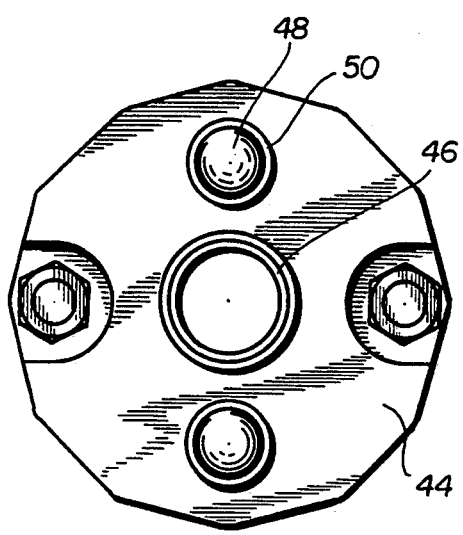
FIG. 6 is an end view of the switch as viewed along line 6—6 in FIG. 3.
Figure 7:
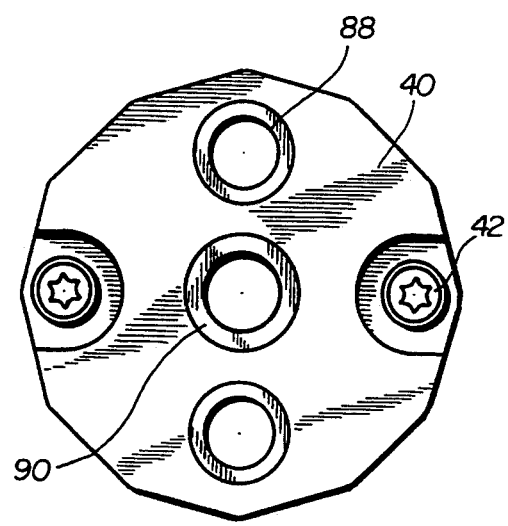
FIG. 7 is an end view of the switch as viewed along line 7—7 in FIG. 3.
Figure 8:
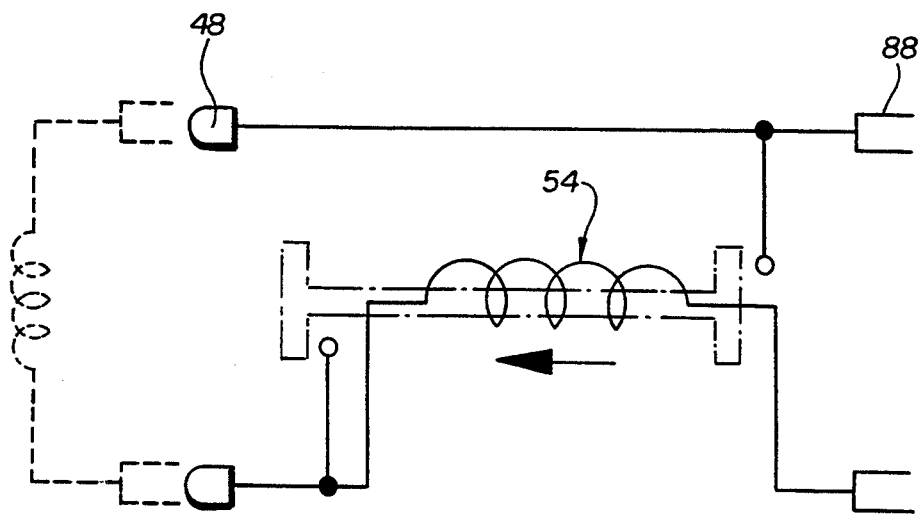
FIG. 8 is a schematic of the internal connections of the switch of the first embodiment.
Figure 9:
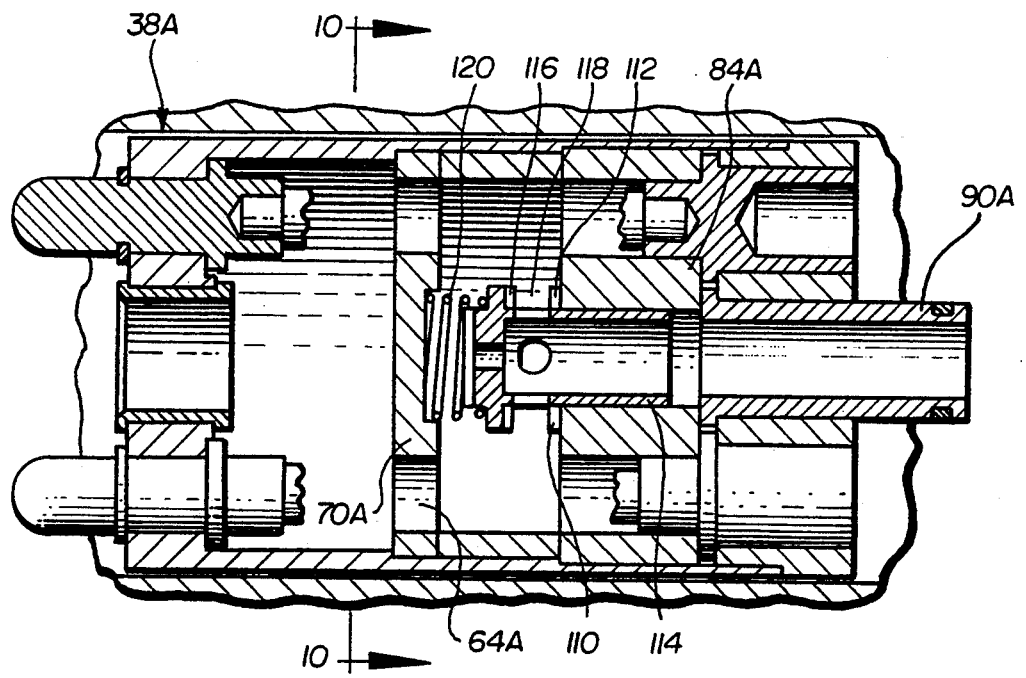
FIG. 9 is a sectional view of a second embodiment of the switch according to the present invention.

As shown in FIG. 4, the modular switch 22 is comprised of a connection and switching arrangement retained within a non-conductive housing assembly 38. The housing assembly 38 is capped by a module cover 40 which is retained thereon by through-screws 42.

Housing assembly 38 is comprised of housing blank 44 with molded oil connection ferrule 46. Housing assembly 38 is molded from a non-conductive and highly temperature resistant material such as Polyetheretherketone (PEEK) or a polyimide compound such as materials known by the tradenames TORLON or VESPEL. Oil connection ferrule 46 is metallic. Housing assembly 38 holds and locates male connectors 48 within through holes through the base of housing assembly 38 by clips 50. Male connectors 48 are connected by suitable means such as a crimp, braze or solder to leads 52.

Housing assembly 38 also holds and locates solenoid assembly 54 which is comprised of a solenoid armature 56 located within solenoid field 58. Solenoid field 58 is constructed as a coil winding 60. The coil winding 60 is in series with rotating main generator field 30. The coil winding 60 is contained within a bobbin 62 constructed from suitable non-conductive, high temperature material. Oil tubes 64 and screw liners 66 are located in holes placed in the bobbin sides and imbedded within winding 60.

Solenoid armature 56 is a sliding arrangement comprising a non-magnetic plunger assembly 68 attached to a ferromagnetic reaction plate 70 by mean of nut 72. Spring 74 is included between field 58 and armature 56 to maintain a closed contact under normal or passive conditions. Plunger assembly 68 is made from a non-magnetic stainless steel shell 76 containing a copper conductor 78 which connects toroid contact 80 to button-shaped contact 82. Copper conductor 78 consists of a length of wire which is doubled over upon itself one or more times in order to cancel any flux field produced by the current carrying conductor. All of the mechanical reaction is accomplished by steel shell 76, while all of the electrical conduction is accomplished by copper conductor 78 with its contacts 80 and 82.

Contact plate 84 is also contained within housing assembly 38 and serves as a holder and locator for wired contact 86, two female connectors 88 and oil transfer tube 90. Contact plate 84 is made from a non-conductive material similar to the one used for housing blank 44. Cushioning spring 92 is included between armature 56 and contact plate 84 to cushion the impact that return spring 74 causes on contacts 80 and 82. Cushioning spring 92 also balances the solenoid armature 56 because the force exerted by cushioning spring 92, plus the force exerted by the flowing oil against the reaction plate 70 should just exceed the force exerted on the plunger assembly 68 by return spring 74. This provides a secondary mechanism to open the short across rotating main generator field 30 so proper generation can take place.

In a generate mode, when rotor shaft 24 is rotated by a prime mover (not shown), flux lines from permanently magnetized field 94 of Permanent Magnet Generator (PMG) 96 intersect conductors in stationary PMG armature 98 to produce AC power in that member. This comparatively low power is used primarily for self-excitation and is rectified, conditioned then metered back to stationary exciter field 36 by voltage regulator 100 which is normally external to the rotating machine. The amount of power delivered to exciter field 36 by voltage regulator 100 depends on the voltage sensed at the output terminals 101 of the generator.

The magnetic field set up in exciter field 36 is used to generate 3-phase AC power in rotating exciter armature 34. This power is used to energize rotating main generator field 30 after being rectified to DC by rotating rectifier assembly 102. Switch 22 is located inside the hollow rotor shaft 24 in series with the rotating rectifier assembly 102. The switch 22 disables the rotating main generator field 30 by creating a short-circuit in the main generator field 30 during the start cycle to protect the rectifier assembly 102.

When the prime mover is stopped, switch 22 is held closed by spring 74 which causes the rotating main generator field 30 to be disabled because of a short-circuit across the rotating main generator field 30. In addition, the only oil present is contained within the rotor shaft 24 and is not flowing because the oil pump, also driven by the engine, is not running.

When a start command is given, the rotor shaft 24 begins to rotate under its own power. As speed gradually increases, fluid, such as oil which is used as a coolant, is pumped throughout a coolant circulation system of the generator and through the rotor shaft 24 and begins exerting force upon a plunger assembly 68 within switch 22. The cushioning spring 92 that balances the plunger assembly 68 against that force is selected to trigger only when the oil reaches a predetermined flow rate, close to engine idle speed. Just before reaching idle speed, the voltage regulator 100, reacting upon the frequency it reads from PMG armature 98, opens the start contactor and turns the stationary exciter field 36 on. The current sent to rotating main generator field 30 first activates the solenoid assembly 54 within switch 22, to open the path across rotating main generator field 30, allowing it to enter the generate mode.

An additional feature of the present invention is the external surface of the assembly which is composed of flattened surfaces or flats 104. Return passages or gaps 106 are formed between the flats 104 and an inside surface 108 of the rotor shaft 24. Oil flows through the inside of the switch 22 and then returns by circulating through the gaps 106.

Figure 10:
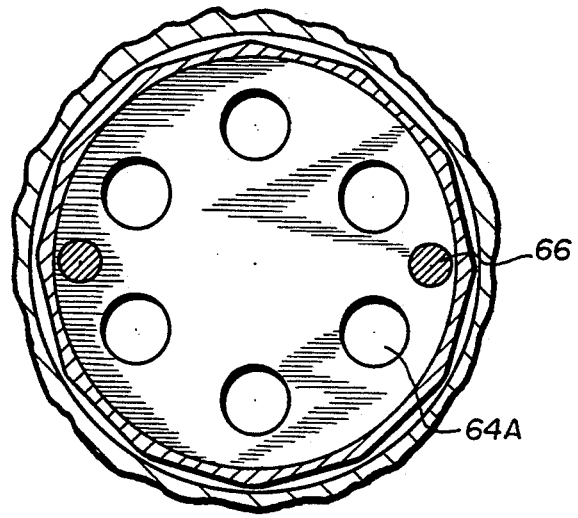
FIG. 10 is a cross-sectional detail of the switch taken along line 10—10 in FIG. 9.
Figure 11:
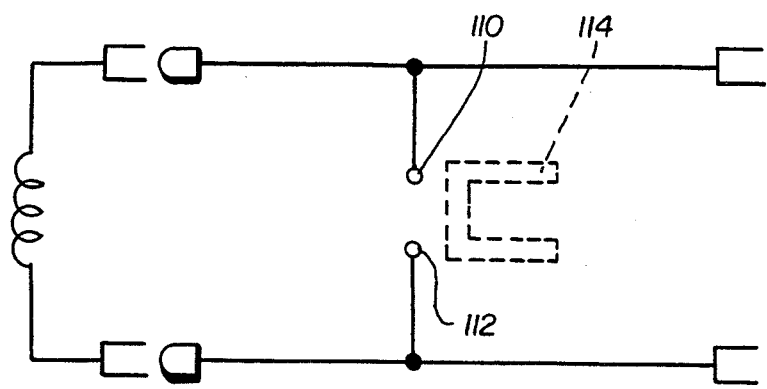
FIG. 11 is a schematic of the internal connections of the switch of the second embodiment.

FIG. 10 represents the second embodiment of the present invention. The switch 222 is used as a primary actuation means in benign applications or as a secondary, redundant actuation means in the case of solenoid assembly 54 failure. It should be noted that structures of the second embodiment which are substantially similar or identical to corresponding structures of the first embodiment are identified with the same reference numerals with the addition of an alphabetic suffix. The switch 222 of the second embodiment is not electrically operated, rather, it is mechanically operated by fluid flowing therethrough.

The modular switch 22A is comprised of a housing assembly 38A located inside a hollow rotor shaft 24. A transfer tube 90A transfers fluid, such as oil, into the switch 22A. Housing assembly 382 contains terminals 10 and 112 mounted on the contact plate 84A. Housing assembly 38A contains sliding poppet 114 which is connected to the transfer tube 90A. Toroid jumper 116 is mounted on sliding poppet 114. Sliding poppet 114 has windows 118 to allow fluid to exit the poppet 114. A return spring 120 is positioned between reaction plate 70A and sliding poppet 114 to maintain a closed contact between the terminals 10 and 112 and toroid jumper 116 to disable the rotating main generator field 30 by creating a short circuit when no fluid is flowing through the switch 22A.

When the start command is given the flow of oil through transfer tube 90A enters sliding poppet 114. The oil must exit through windows 118 which are located at right angles from the axial direction of the flow. This causes the poppet 114 to be pushed to the rear, compressing return spring 120 and breaking the contact between terminals 110 and 112 made by toroid jumper 116. When the flow of oil through oil tubes 64A is stopped or otherwise insufficient to break the contact, the return spring 120 forces the terminals and 112 to complete the short circuit across the rotating main generator field 30.

While a preferred embodiment of the present invention is shown and described, it is envisioned that those skilled in the art may devise various modifications of the present invention without departing from the spirit and scope of the appended claims. The invention is not intended to be limited by the foregoing disclosure.

What is claimed is:

1. A device operable either as a generator or as an induction motor or both as a generator and as an induction motor comprising:
   a hollow rotor shaft,
   said hollow rotor shaft permitting fluid to pass therethrough,
   said hollow rotor shaft having a central axis extending therethrough;
   an exciter having a rotating exciter armature and a stationary exciter field exterior to said hollow rotor shaft;
   a main generator having a rotating main generator field and a main generator armature exterior to said hollow rotor shaft;
   a rectifier assembly coupled between the rotating exciter armature and the rotating main generator field; and
   a switch operatively coupled to said main generator field positioned inside said hollow rotor shaft along said central axis for selectively disabling the rotating main generator field;
   said switch including a housing, an opening in said housing to allow fluid to flow into said housing, and a first solenoid actuator positioned within said housing for activating the switch to disable said main generator field and a second solenoid actuator positioned in said housing for activating the switch to disable said main generator field.

2. A device as recited in claim 1, wherein said first actuator comprises:
   a solenoid assembly, which includes,
   a solenoid armature,
   a solenoid field disposed around said armature, and
   a spring located between said field and said armature to maintain a closed contact under normal or passive conditions; and
   a contact means on said housing for contacting the solenoid assembly.

3. A device as recited in claim 2, wherein said solenoid field comprises:
   a bobbin, and
   coil windings within said bobbin connected in series with said rotating main generator field; and
   said solenoid armature includes,
   a sliding plunger having contacts thereon,
   a reaction plate attached to said plunger, and
   a cushioning spring between said solenoid armature and said contact means.

4. A device as recited in claim 2, wherein said second actuator comprises:
   said solenoid field permitting fluid to pass therethrough from the hollow rotor shaft such that when the fluid flow reaches a predetermined speed during a start-up cycle, said fluid flow creates a pressure upon said solenoid armature causing said solenoid armature to contact said contact means.

5. A device as recited in claims 1 or 6, wherein said means for switch is modular.

6. A device as recited in claims 1 or 6, wherein said housing has an external surface defining flat faces, and
   said flat faces on said external surface of said housing and an inside surface of said hollow rotor shaft define passages for allowing fluid flowing through said rotor shaft to pass over said external surface of said housing.

7. A device operable either as a generator or as an induction motor or both as a generator and as an induction motor comprising:
   a hollow rotor shaft,
   said hollow rotor shaft permitting fluid to pass therethrough,
   said hollow rotor shaft having a central axis extending therethrough;
   an exciter having a rotating exciter armature and a stationary exciter field exterior to said hollow rotor shaft;
   a main generator having a rotating main generator field and a main generator armature exterior to said hollow rotor shaft;

a rectifier assembly coupled between the rotating exciter armature and the rotating main generator field said switch including:

a housing;

contacts on said housing;

an opening in said housing for allowing fluid to flow into said housing;

a hollow sliding poppet, said poppet having a bore longitudinally extending therethrough, a first end of said poppet open to fluid flowing into said housing, a second end of said poppet having orifices perpendicular to the flow of the fluid to allow the fluid to exit the poppet, and contacts cooperatively positioned on said second end for controllably contacting said contacts on said housing; and means for maintaining a closed contact between the contacts on the housing and the contacts on the poppet.

8. A device as recited in claim 6, wherein said means for maintaining a closed contact is a spring.

9. A device operable either as a generator or as an induction motor or both as a generator and as an induction motor including;

a hollow rotor shaft, said hollow rotor shaft permitting fluid to pass therethrough;

a central axis longitudinally extending though said hollow rotor shaft;

an exciter having a rotating exciter armature and a stationary exciter field exterior to said hollow rotor shaft;

a main generator having a rotating main generator field and a main generator armature exterior to said hollow rotor shaft;

a rectifier assembly coupled between the rotating exciter armature and the rotating main generator field; and a switch operatively coupled to said main generator positioned inside said hollow rotor shaft along said central axis for selectively disabling the rotating main generator field, said switch comprising:

a housing;

an opening in said housing to allow fluid to flow into said housing, a first actuator positioned within said housing for activating the switch to disable the device and a second actuator positioned in said housing for activating the switch to disable the device, wherein said first actuator comprises, a solenoid assembly, which includes, a solenoid armature having a sliding plunger with contacts, and, a reaction plate attached to said plunger;

a solenoid field disposed around said armature having a bobbin, and coil windings connected in series with said rotating main generator field within said bobbin; and a spring located between said field and said armature to maintain said field in contact with said armature, and a contact means on said housing for contacting the solenoid assembly, and a cushioning spring between said solenoid armature and said contact plate, wherein said second actuator comprises;

said solenoid field permitting fluid to pass therethrough from the hollow rotor shaft such that when the fluid flow reaches a predetermined speed during start-up, said fluid flow creates a pressure upon said solenoid armature and causes said solenoid armature to contact said contact means, and said housing has an external surface defining flat faces, and said flat faces on said external surface of said housing and an inside surface of said hollow rotor shaft define passages for allowing fluid flowing through said rotor shaft to pass over said external surface of said housing.

10. A device operable either as a generator or as an induction motor or both as a generator and as an induction motor including;

a hollow rotor shaft, said hollow rotor shaft permitting fluid to pass therethrough, said hollow rotor shaft having a central axis extending therethough;

an exciter having a rotating exciter armature and a stationary exciter field exterior to said hollow rotor shaft;

a main generator having a rotating main generator field and a main generator armature exterior to said hollow rotor shaft;

a rectifier assembly coupled between the rotating exciter armature and the rotating main generator field; and a switch operatively coupled to said main generator field positioned inside said hollow rotor shaft along said central axis for selectively disabling the rotating main generator field, said switch comprising:

a housing;

contacts on said housing;

an opening in said housing to allow the passage of the fluid into said housing;

a hollow sliding poppet, said poppet having a bore longitudinally extending therethrough, a first end open to fluid flowing into said housing, a second end having orifices perpendicular to the flow of the fluid to allow the fluid to exit the poppet, and contacts on said second end;

means for maintaining a closed contact between the contacts on the housing and the contacts on the poppet;

said housing has an external surface defining flat faces, and said flat faces on said external surface of said housing and an inside surface of said hollow rotor shaft define passages for allowing fluid flowing through said rotor shaft to pass over said external surface of said housing.

11. An electromechanical device including:

a hollow rotor shaft, said hollow rotor shaft permitting fluid to pass therethrough, said hollow rotor shaft having a central axis extending therethrough;

a main generator having a rotating main generator field and a main generator armature exterior to said hollow rotor shaft; and means for disabling said main generator field comprising:

a housing located in said hollow rotor shaft, a first solenoid actuator positioned within said housing and responsive to an electrical means for disabling said main generator field and a second solenoid actuator positioned in said housing and responsive to a mechanical means for disabling said main generator field.

* * * * *

UNITED STATES PATENT AND TRADEMARK OFFICE
CERTIFICATE OF CORRECTION

PATENT NO. : 5,345,125
DATED : September 6, 1994
INVENTOR(S) : Bernard A. Raad

Figure 3:
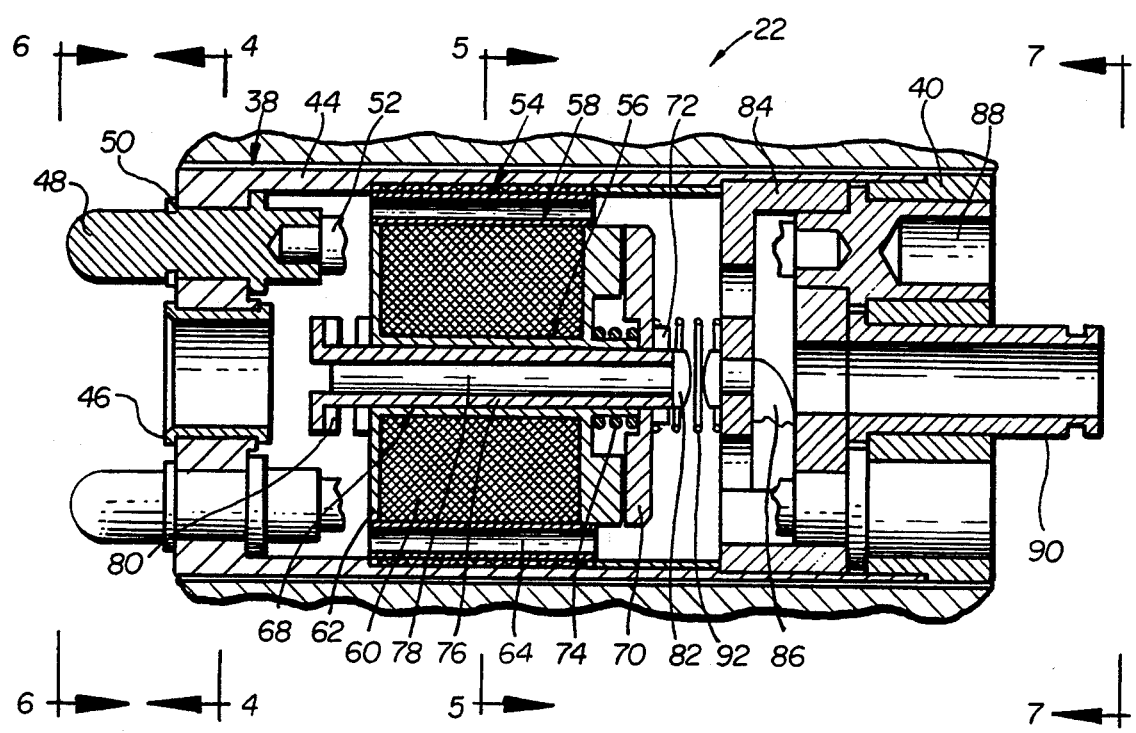
FIG. 3 is a partial fragmentary cross sectional side elevational view of a first embodiment of the switch according to the present invention.

It is certified that error appears in the above-indentified patent and that said Letters Patent is hereby corrected as shown below:

Column 3, Line 35 "Fig. 4," should be — Fig. 3, —

Column 5, Line 11 "222" should be — 22A —

Column 5, Line 19 "222 of" should be —22A of —

Column 5, Line 25 "382" should be —38A—

Column 5, Line 26 "10" should be —110—

Column 5, Line 34 "10" should be —110—

Column 5, Line 47 "terminals and" should be —terminals 110 and—

Signed and Sealed this

Thirty-first Day of January, 1995

Attest:

BRUCE LEHMAN

Attesting Officer    Commissioner of Patents and Trademarks